United States Patent [19]
Jones

[11] 3,911,574
[45] Oct. 14, 1975

[54] INTERNAL PIPE CUTTING APPARATUS
[76] Inventor: Donnie R. Jones, 35 Oak View Drive, San Rafael, Calif. 94903
[22] Filed: Nov. 21, 1974
[21] Appl. No.: 525,849

Related U.S. Application Data
[63] Continuation of Ser. No. 300,206, Oct. 24, 1972, abandoned.

[52] U.S. Cl. .................................. 30/105; 30/103
[51] Int. Cl.² ............... B23D 21/10; B23D 21/14; B26D 3/16
[58] Field of Search ...................... 30/103, 104, 105

[56] References Cited
UNITED STATES PATENTS

| 594,081 | 11/1897 | Hervey | 30/105 |
|---|---|---|---|
| 1,084,097 | 1/1914 | Maupin | 30/105 |
| 1,100,760 | 6/1914 | Morelli | 30/105 |
| 2,280,769 | 4/1942 | Page | 166/55.7 X |
| 3,283,405 | 11/1966 | Braswell | 30/103 |
| 3,396,795 | 8/1968 | Venghiattis | 166/55.7 |

Primary Examiner—James L. Jones, Jr.
Assistant Examiner—J. T. Zatarga
Attorney, Agent, or Firm—Edwin H. Baker

[57] ABSTRACT

Apparatus for internally cutting plastic pipe having a shaft, centered means slideably and rotably mounted on the shaft for centering the shaft inside the pipe, means for controlling the distance of entry of the shaft inside the pipe, a sawhead perpendicularly attached to the shaft, cutting surfaces attached to the saw head whereby the cutting surfaces upon rotation of the saw head by the shaft are thrown by centrifugal force outward away from the shaft onto the inner surface of the pipe for cutting engagement.

10 Claims, 12 Drawing Figures

U.S. Patent　Oct. 14, 1975　Sheet 1 of 2　3,911,574
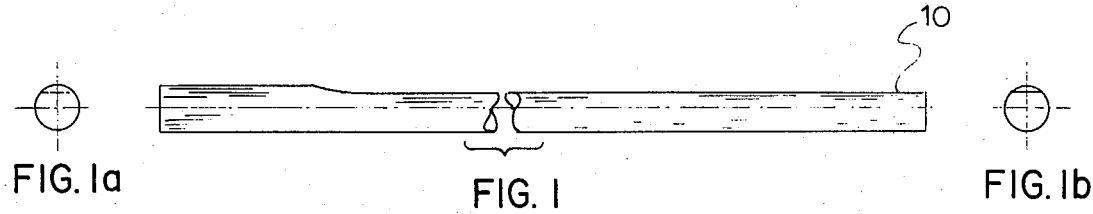
FIG. 1a　FIG. 1　FIG. 1b
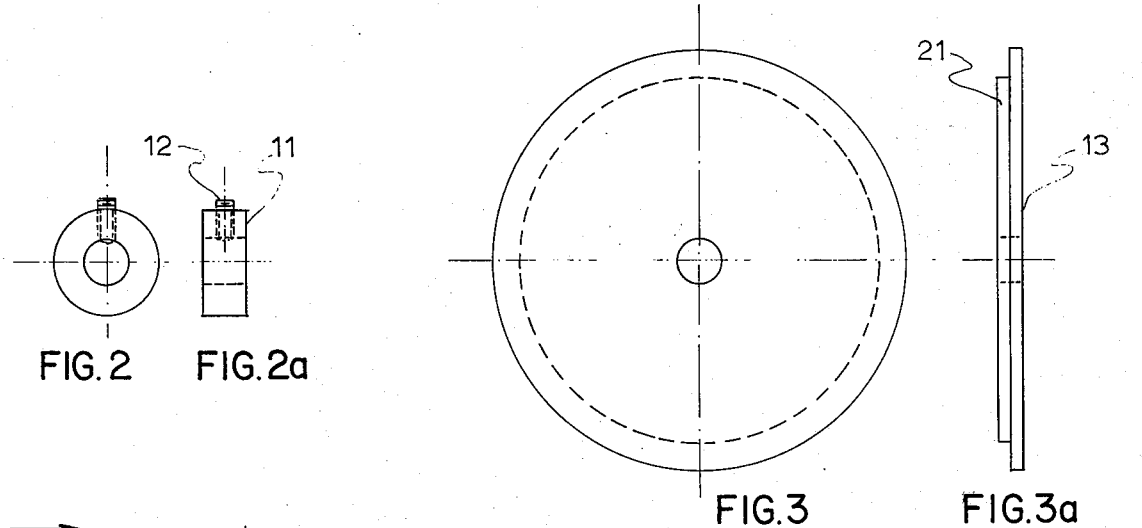
FIG. 2　FIG. 2a　FIG. 3　FIG. 3a
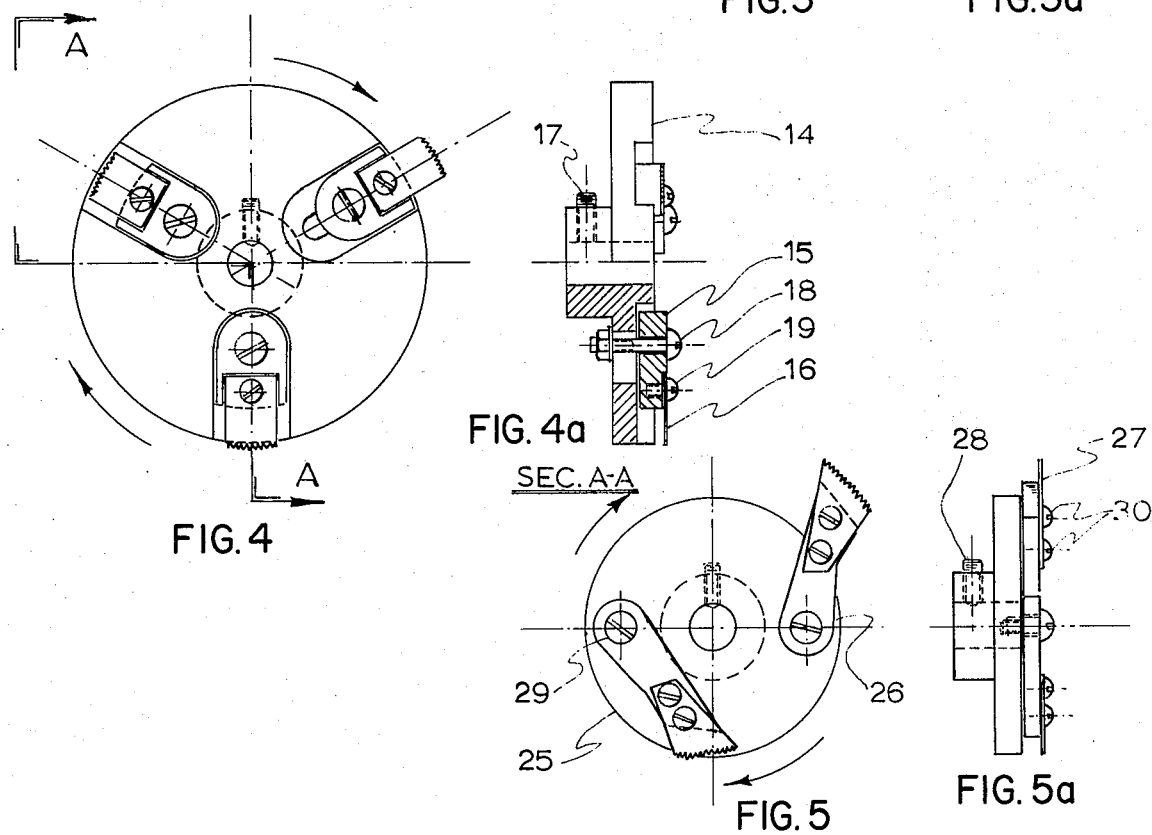
FIG. 4　FIG. 4a　SEC. A-A　FIG. 5　FIG. 5a

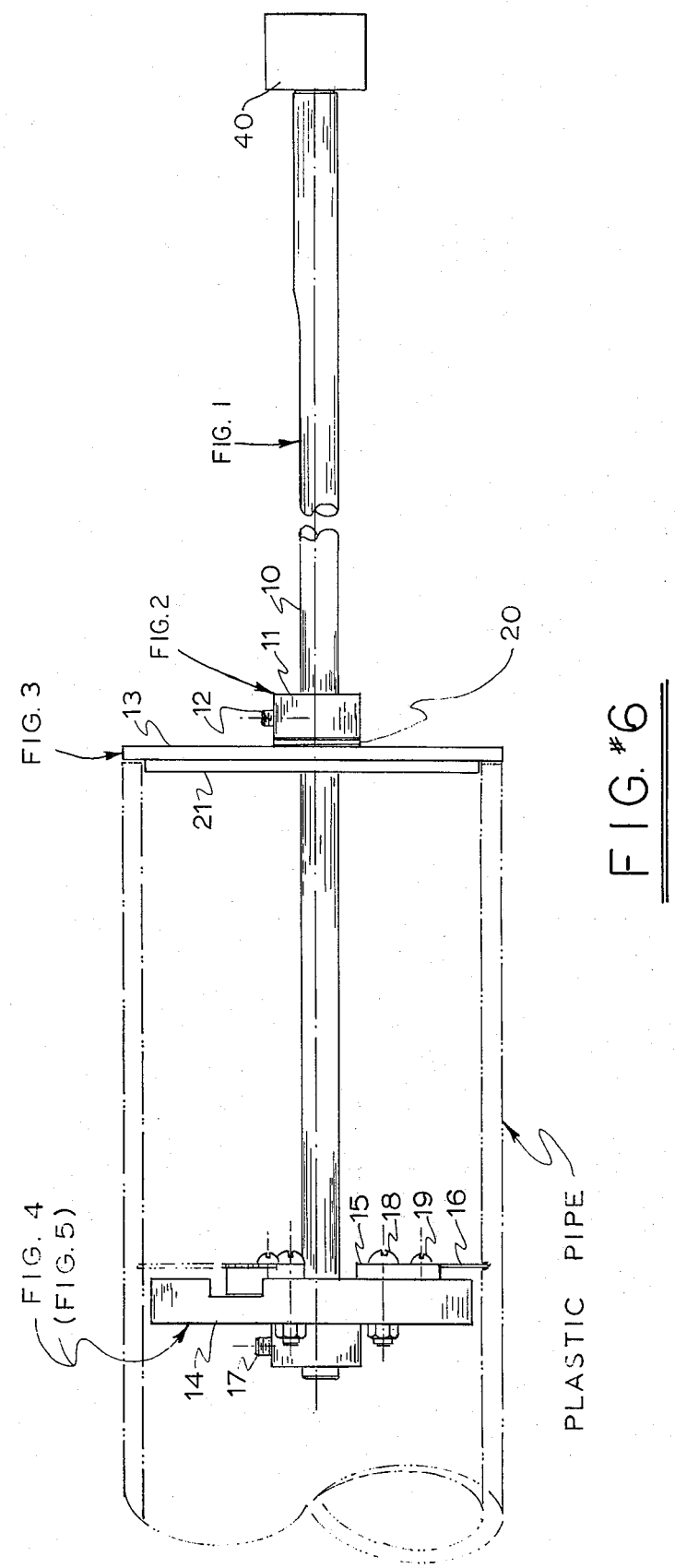

INTERNAL PIPE CUTTING APPARATUS

This is a continuation of application Ser. No. 300,206, filed Oct. 24, 1972, now abandoned.

This invention relates to novel and useful apparatus for cutting pipe, especially various types of plastic pipe and more particularly to apparatus which is adapted to cut the pipe internally.

During the construction of various buildings such as homes, apartments or office buildings it is not always possible to measure accurately the needed length of plastic pipe and cut it to the proper length before installing it. Or if it is possible to measure it accurately, it is often found that the pipe is too long due to erroneous cutting.

This problem has been solved only by the expensive and time consuming task of removing the pipe and recutting it to proper size.

The apparatus of the present invention provides a simple and inexpensive means for cutting pipe without removing it from its temporary installation position.

It is an object of the present to provide a cutting instrument capable of cutting a plastic pipe from the inside thereof so that a portion of an end of the pipe can be removed.

It is another object of the present invention to provide an internal pipe cutter which employs a circular disk-shaped head having one or more retractable surfaces, said head being mounted on one end of a rotatable shaft which upon being rotated causes the cutting surfaces to move outward away from the shaft by centrifugal force against the inner surface of the pipe for the cutting thereof.

Still a further object is to provide apparatus that will quickly cut a pipe from the inner surface at a right angle to the pipe's longitudinal axis.

It is still another object of the present invention to provide an internal pipe cutter of the class described which is simple and compact in construction, economical of manufacture, efficient in operation and which can be powered by conventional hand held electric drills.

Other objects, features and advantages of this invention will be apparent from the following detail description and appended claims, reference being made to the accompanying drawings forming a part of the specification wherein like reference numerals designate corresponding parts of the several views.

FIG. 1 is a side view of a shaft and FIGS. 1a and 1b are two end views.

FIG. 2 is a side view and FIG. 2a is an end view of a set collar with fastening screws.

FIG. 3 is an end view and FIG. 3a is a side view of an alignment ring.

FIG. 4 is an end view of a saw head assembly and FIG. 4a is a side elevation in partial section of a saw head assembly.

FIG. 5 is an end view and FIG. 5a is a side view of an alternate saw head assembly.

FIG. 6 is a full side assembly view of apparatus within the purview of this invention and one embodiment of internal pipe cutting apparatus positioned for cutting a section of pipe.

Referring to the drawings, and in particular to FIGS. 1–5, an illustrative embodiment of the internal pipe cutting apparatus comprises:

Shaft 10 which is generally cylindrically shaped and on which is adjustably mounted set collar 11 with fastening set screw 12 and slideably mounted retainer ring 13. Retainer ring 13 has a lip 21 which is substantially the same diameter as the inside diameter of the pipe to be cut. As can be seen in FIG. 6, set collar 11 is positioned along shaft 10 with set screw 12 at any desired point depending upon the length of pipe to be cut. Attached to an end of shaft 10 is saw head 14 by set screw 17. Generally the saw head is positioned near the end of the shaft, however it can be positioned more toward the middle of the shaft if desired.

As shown in FIG. 6, an automatic power means 40 is attached to the other end of Shaft 10. An example of an automatic power means is an electric hand drill, hereinafter discussed. The automatic power means 10 is used to rapidly rotate Shaft 10.

Saw head 14 can be circular or another shape so long as it is free to rotate inside a pipe to be cut.

As shown in FIG. 6, saw head 14 has a diameter slightly smaller that the inside diameter of the pipe to be cut. Once the saw head is positioned on shaft 10 it is normally not removed.

As shown in FIG. 4, saw head 14 is provided with weight member 15. The weight member is slideably attached to a surface of saw head 14 in such a manner that upon the revolution of saw head 14, weight member 15 is thrown outward away from shaft 10 along a radial path by centrifugal force.

A convenient attachment of weight member 15 is to set it in a slot that has been cut in one surface of saw head 14. The weight member is slideably secured in the slot through pin 18. Pin 18 is positioned through an elongated hole in saw head 14 and is free to slide in the hole in a path along its length. The diameter of pin 18 is slightly less than the width of the hole so there is only a very small amount of movement of the pin transverse to the length of the elongated hole.

Since pin 18 is attached to weight member 15, the position and length of the hole in saw head 14 will determine the distance that weight member 15 can move. Preferably it is desirable to limit the travel of weight member 15 to the inside of the circumferential edge of saw head 15, however such is not necessary.

Saw blade 16 is attached to weight member 15 by any convenient manner such as by cutting a slot in the open surface of weight member 15 and attaching it therein by screw 19.

Preferably saw blade is removeably attached to weight member 15 so that a new saw blade can be substituted for a worn one.

Preferably at least two weight members 15 with attached saw blades 16 should be provided on saw head 14, preferably equispaced. The maximum number will be determined by the diameter of saw head 14 and the size of weight member 15.

Saw blade 16 can have various types of teeth, however it is preferred to use teeth of a wide set.

Saw blade 16 must be positioned on weight member 15 in such a manner that the cutting action of the teeth is not restricted.

The saw teeth can run in a straight line, however it is preferred that they run in a circular path of the same diameter of the pipe to be cut. This allows the maximum contact of the saw teeth and thus permits the most efficient sawing of the pipe.

Saw blade 16 could be eliminated as a separate part if weight member 15 were constructed with saw teeth similar to those of saw blade 16. However such construction is not preferred as it is more expensive to replace a worn sawing surface.

FIG. 5 shows an alternate saw head 26 for saw head 14 which is also circular disk-shaped. Here again saw head 26 could be of any shape, such as hexagon shaped, so long as it is free to rotate inside the work piece to be cut. Saw head 26 is attached to shaft 10 by set screw 28 in the same manner as saw head 14.

Weight member 26 is pivotably attached to saw head 26 by pin 29 so that it is thrown outward away from shaft 10 along an arcuate path by centrifical force as saw head 26 rotates.

Saw blade 27 is attached to weight member 26 by any convenient manner such as by cutting a slot in the open surface of weight member 26 and attaching it therein by a screw or through the use of screws 30.

Preferably saw blade 27 is removeably attached to weight member 26 so that a new saw blade can be substituted for a worn one.

Saw blade 27 can have various types of teeth, however it is preferred to use teeth of a wide set. Also, saw blade 27 must be positioned on weight member 26 in such a manner that the cutting action of the teeth is not restricted.

The saw teeth can run in a straight line, however it is much preferred that they run in a circular path of the same diameter as the pipe to be cut. This allows the maximum contact of the saw teeth and thus permits the most efficient sawing of the pipe.

Similarly, saw blade 27 could be eliminated as a separate part if weight member 15 were constructed with saw teeth similar to those of saw blade 27. However such construction is not preferred as it is more expensive to replace a worn sawing surface.

The preferred cutting surfaces are saw blades (blade 16 or in the alternative saw blade 27) however other types of cutting surfaces are contemplated.

Preferably at least two weight members with attached saw blades 27 should be provided on saw head 26, preferably equispaced. The maximum number will be determined by the diameter of saw head 26 and the size of weight member 26.

In operation, the free end of shaft 10 is placed in the jaws of an electric hand drill. Set collar 11 is positioned in the end of the pipe to be cut to exactly align shaft 10 down the center of the work piece. Set collar 11 is secured to shaft 10 by set screw 12 to permit the pipe to be cut at the desired point and to prevent shaft 10 from entering the work piece beyond the desired depth. Shaft 10 can be provided with inch and parts of an inch markings for cutting off a certain desired length of pipe. The saw head 14 is placed inside a plastic pipe to be cut.

Retainer ring 13 is positioned in the end of the pipe to be cut. Different sized retainer rings are needed for the various sizes of pipe or several sized lips can be provided on a retainer ring.

Before engagement of the electric hand drill that is coupled to shaft 10, a slight pressure is exerted by the operator toward the work piece. Washer 20, preferably having a smooth surface, prevents binding between set collar 11 and retainer ring 13 upon rotation of shaft 10.

Saw head 14 (or in the alternative saw head 26) is caused to rotate by the rotation of shaft 10. The rotation of saw head 14 (or in the alternative saw head 26) causes weight members 15 (or in the alternative weight members 26) with attached saw blades 16 (or in the alternative saw blades 27) to be thrown radially outward (or in the alternative, arcularly) away from shaft 10 to engagement with the inner surface of the work piece by centrifugal force. The saw blades are held against the inner surface of the pipe upon continued rotation of shaft 10 and such engagement quickly and conveniently cuts the pipe.

I claim:

1. Apparatus comprising a shaft, centering means slideably and rotably mounted on the shaft for centering the shaft inside a pipe, means for controlling the distance of entry of the shaft inside the pipe, a sawhead perpendicularly attached to the shaft, radially aligned track means disposed in said sawhead, cutting surfaces slideably attached to said track means, means for slideably attaching the cutting surfaces to said track means and automatic power means for rapidly rotating said shaft, whereby the cutting surfaces upon rotation of the shaft and saw head are thrown by centrifugal force radially outward along the track means and away from the shaft onto the inner surface of the pipe for cutting engagement therewith.

2. The apparatus of claim 1 wherein said cutting surfaces are removably mounted on weight members.

3. The apparatus of claim 2 wherein said cutting surfaces are saw blades.

4. The apparatus of claim 1 wherein said centering means is a disk-shaped retainer ring.

5. The apparatus of claim 1 wherein said centering means is a disk-shaped retainer ring and said means for controlling the distance of entry of the shaft inside the pipe comprises a set collar.

6. The apparatus of claim 5 wherein said cutting surfaces have a circular contour.

7. Apparatus for use in combination with automatic power means comprising a shaft adopted to be rapidly rotated by said automatic power means, centering means slideably and rotably mounted on the shaft for centering the shaft inside a pipe, means for controlling the distance of entry of the shaft inside the pipe, a sawhead perpendicularly attached to the shaft, radially aligned track means disposed in said saw head; cutting surfaces slideably attached to said track means, means for slideably attaching the cutting surfaces to said track means whereby the cutting surfaces upon rotation of the shaft and saw head by said automatic power means are thrown by centrifugal force radially outward along the track means and away from the shaft onto the inner surface of the pipe for cutting engagement therewith.

8. The apparatus of claim 7 wherein said cutting surfaces are removably mounted on weight members.

9. The apparatus of claim 8 wherein said cutting surfaces are saw blades.

10. The apparatus of claim 7 wherein said centering means is a disk-shaped retainer ring and said means for controlling the distance of entry of the shaft inside the pipe comprises a set collar.

* * * * *